(12) United States Patent
Hakkaku (10) Patent No.: US 10,293,554 B2
(45) Date of Patent: May 21, 2019

(54) THREE-DIMENSIONAL OBJECT FORMING DEVICE AND THREE-DIMENSIONAL OBJECT FORMING METHOD

(71) Applicant: MIMAKI ENGINEERING CO., LTD., Nagano (JP)

(72) Inventor: Kunio Hakkaku, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 583 days.

(21) Appl. No.: 14/860,663

(22) Filed: Sep. 21, 2015

(65) Prior Publication Data

US 2016/0082654 A1 Mar. 24, 2016

(30) Foreign Application Priority Data

Sep. 24, 2014 (JP) ................. 2014-193652

(51) Int. Cl.
| | |
|---|---|
| *B29C 64/112* | (2017.01) |
| *B29C 67/00* | (2017.01) |
| *B29C 35/08* | (2006.01) |
| *B33Y 10/00* | (2015.01) |
| *B33Y 30/00* | (2015.01) |
| *B29C 64/40* | (2017.01) |

(52) U.S. Cl.
CPC ...... *B29C 67/0059* (2013.01); *B29C 35/0805* (2013.01); *B29C 64/112* (2017.08); *B29C 64/40* (2017.08); *B33Y 10/00* (2014.12); *B33Y 30/00* (2014.12); *B29C 2035/0827* (2013.01); *B29K 2995/002* (2013.01)

(58) Field of Classification Search
CPC ....... B29C 64/112; B29C 64/40; B33Y 10/00; B33Y 30/00

USPC ....................................... 425/379.1
See application file for complete search history.

(56) References Cited

U.S. PATENT DOCUMENTS 6,259,962 B1 * 7/2001 Gothait .............. B29C 41/36
700/119

FOREIGN PATENT DOCUMENTS

| JP | 2004291625 | 10/2004 |
|---|---|---|
| JP | 4420685 | 12/2009 |

(Continued)

OTHER PUBLICATIONS

"Notice of Reasons for Rejection of Japanese Counterpart Application," dated Jun. 26, 2018, with English translation thereof, pp. 1-11.

(Continued)

*Primary Examiner* — Christina A Johnson
*Assistant Examiner* — Xue H Liu
(74) *Attorney, Agent, or Firm* — JCIPRNET (57) ABSTRACT

A three-dimensional object forming device, for forming a three-dimensional object by an additive manufacturing method, is provided. The three-dimensional object forming device includes: a head unit, having at least one inkjet head provided with at least one nozzle row; and a main scanning drive unit. The head unit has a plurality of nozzle rows, and forms a plurality of laminated ink layers on at least some area. Each of the nozzles in the plurality of nozzle rows discharges an ink droplet to each different position in an operation of forming one of the ink layers; and in an operation of forming at least any two ink layers, laminated successively, ink droplets are discharged in such a way that ink dots formed by the same nozzle are not stacked at the same position.

11 Claims, 6 Drawing Sheets

(56) References Cited

FOREIGN PATENT DOCUMENTS

| JP | 2012071611 | 4/2012 |
|---|---|---|
| JP | 2013067118 | 4/2013 |
| JP | 2014503385 | 2/2014 |

OTHER PUBLICATIONS

"Office Action of Japan Counterpart Application," dated Feb. 5, 2019, with English translation thereof, pp. 1-9.

* cited by examiner

THREE-DIMENSIONAL OBJECT FORMING DEVICE AND THREE-DIMENSIONAL OBJECT FORMING METHOD

CROSS REFERENCE TO RELATED APPLICATIONS

This application claims the priority benefit of Japan application serial no. 2014-193652, filed on Sep. 24, 2014. The entirety of the above-mentioned patent application is hereby incorporated by reference herein and made a part of specification.

TECHNICAL FIELD

The present disclosure relates to a three-dimensional object forming device and a three-dimensional object forming method.

DESCRIPTION OF THE BACKGROUND ART

In recent years, a 3D printer for forming a three-dimensional object having a 3D shape is used for various uses. Meanwhile, conventionally known is a method of forming a three-dimensional object (an inkjet lamination method) by way of discharging a material for the three-dimensional object from an inkjet head (recording head) (for example, refer to Japanese Patent No. 4420685).

SUMMARY

In an inkjet head, a nozzle for discharging ink droplets has a significantly minute structure. Therefore, it is difficult to prevent variation somewhat with respect to a discharging performance of nozzles from arising.

In the meantime, conventionally an inkjet head is popularly used in an inkjet printer and the like, for printing a two-dimensional (2D) image. Then, for such an application, even though there arises variation somewhat with respect to a discharging performance of nozzles, it is still possible to carry out printing with a sufficient image quality, for example, by way of printing with a multi-path method.

However, when an inkjet head is used in a three-dimensional object forming device, such as a 3D printer and the like, a three-dimensional object is formed by laminating a plurality of ink layers so that an effect of variation in a discharging performance of nozzles is accumulated by forming the plurality of layers. For example, in the case of forming a single ink layer by using an inkjet head having a nozzle row, unevenness appear in a thickness direction of an ink layer (Z-direction) due to variation in volume of ink droplets discharged from each nozzle. Then, in this case; if a plurality of ink layers are laminated and forming, an effect of unevenness is accumulated according to the number of the ink layers. More concretely to describe, if variation in volume of ink droplets appears in an range of ±10%, laminating the ink layer of 1 cm causes unevenness of 2 mm. Furthermore, as a result, a forming accuracy of a three-dimensional object to be formed is reduced so as to bring a risk that a quality of the three-dimensional object becomes deteriorated. Thus, the present disclosure provides a three-dimensional object forming device and a three-dimensional object forming method that can bring a solution for the subject described above.

On the basis of a serious study with regard to unevenness caused due to variation in volume of ink droplets, the inventor of the present disclosure thought that the unevenness become a problem especially because a scanning operation (a main scanning operation and the like) is carried out for laminating ink layers in such a way as to form the same position on each of the ink layers by using the same nozzle. Then, at first, with respect to two ink layers laminated successively, the inventor thought of discharging ink droplets to the same position not by using the same nozzle. According to this configuration, it is possible, for example, to appropriately prevent an effect of the unevenness caused due to variation in volume of ink droplets from being accumulated.

However, to carry out such a control, for example, in a configuration of a conventional 3D printer, it becomes necessary to conduct, for example, a similar operation to a multi-pass method to be carried out in an inkjet printer for printing a two-dimensional image. More specifically to describe, for example, every time when an ink layer is formed by an inkjet head, it becomes necessary to carry out an operation of shifting a position of a nozzle to discharge an ink droplet to each position, in a nozzle row direction, and the like. However, in the case of carrying out such a control, a mechanical control for each layer becomes necessary, for example, with an accuracy better than a resolution pitch needed for the forming operation, so that an accuracy of the forming operation may become deteriorated. Moreover, time required for the mechanical control increases, and there is also a possibility that a forming speed is reduced.

Under such a situation, according to a further serious study, the inventor of the present disclosure conceives an idea of using a plurality of inkjet heads, not only a single inkjet head, as inkjet heads (or nozzle rows) for forming a plurality of ink layers on one area. Furthermore, the inventor conceives an idea of carrying out a control with respect to the plurality of inkjet heads so as not to discharge ink droplets with the same nozzle to the same position on two ink layers laminated successively. In other words, to solve the problem described above, the present disclosure includes the following configurations.

(Configuration 1) A three-dimensional object forming device for forming a three-dimensional object by an additive manufacturing method, the three-dimensional object forming device including: a head unit having at least one inkjet head provided with at least one nozzle row in which at least one nozzle is placed in a predetermined nozzle row direction; and a main scanning drive unit for having the head unit carry out a main scanning operation to discharge ink droplets from the nozzle while moving in a main scanning direction that intersects with the nozzle row direction, wherein, the head unit has a plurality of nozzle rows in total, and the head unit forms a plurality of laminated ink layers by using of the plurality of nozzle rows, on at least some area; and each of the nozzles in the plurality of nozzle rows discharges an ink droplet to each different position in an operation of forming one of the ink layers; and in an operation of forming at least any two ink layers, laminated successively, among the plurality of ink layers formed on one area, ink droplets are discharged in such a way that ink dots formed by the same nozzle are not stacked at the same position.

In the case of a configuration as described above, the three-dimensional object can be formed faster by forming one ink layer by use of the plurality of nozzle rows. Moreover, when ink dots formed by the same nozzle are not stacked at the same position on two ink layers laminated successively, it is possible to appropriately prevent an effect of variation in a discharging performance of nozzles from being accumulated. Therefore, according to this configuration as described, for example, in the case of forming a three-dimensional object by an additive manufacturing method by using an inkjet head, it is possible to appropriately control an effect of variation in a discharging performance of nozzles. Furthermore, thus a three-dimensional object can be formed appropriately, for example, with a high degree of accuracy.

Meanwhile, in this configuration, it is preferable that two or more nozzles are placed in the nozzle row. The main scanning direction is, for example, a direction perpendicular to the nozzle row direction. Moreover, the main scanning direction and the nozzle row direction may intersect with each other at an angle other than a right angle. In the meantime, the "variation in a discharging performance of nozzles" is, for example, variation in volume of ink droplets to be discharged, and the like. Moreover, the "at least any two ink layers, laminated successively" is, for example, at least some adjacent ink layers among a plurality of ink layers laminated.

(Configuration 2) The inkjet head discharges ink droplets of ultraviolet curable ink that is cured by irradiation of ultraviolet light. According to this configuration as described, for example, the three-dimensional object can appropriately be formed by the additive manufacturing method. It is preferable that the three-dimensional object forming device is further provided with an ultraviolet light source.

(Configuration 3) Each of the nozzles in the plurality of nozzle rows discharges ink droplets in such a way that ink dots formed by the same nozzle are not stacked at the same position, in an operation of forming both two ink layers laminated successively, among the plurality of ink layers formed on the one area. According to this configuration as described, with respect an effect of variation in a discharging performance of nozzles, it is possible to appropriately prevent the effect of variation from being accumulated, by way of forming the plurality of ink layers.

(Configuration 4) The head unit forms a modeling layer that is an ink layer to constitute at least an internal section of the three-dimensional object, by using the plurality of nozzle rows. The modeling layer that is, for example, an ink layer to constitute an essential part and the like of the three-dimensional object. According to this configuration as described, for example, with respect to the essential part and the like of the three-dimensional object, an effect of variation in a discharging performance of nozzles can appropriately be controlled. Furthermore, thus the three-dimensional object can be formed appropriately with a high degree of accuracy.

(Configuration 5) The head unit forms a supporting layer that is an ink layer to support a circumference of the three-dimensional object in a forming process, by using the plurality of nozzle rows. According to this configuration as described, for example, with respect to the supporting layer, an effect of variation in a discharging performance of nozzles can appropriately be controlled. Furthermore, thus the three-dimensional object can be formed appropriately with a high degree of accuracy.

(Configuration 6) At least some nozzle rows among the plurality of nozzle rows discharge ink droplets of another kind of ink being different from the ink of the other nozzle rows. The "another kind of ink being different" is a kind of ink that is different, for example, in a color or a use application. Then, "a use application" of the ink is a proper use of the ink (e.g., for a modeling layer, for a supporting layer, for coloring, and the like).

If a plurality of nozzle rows are prepared individually for each kind of ink in a three-dimensional object forming device, there is a possibility that the number of required nozzle rows becomes significantly great. Moreover, as a result, there is also a risk that enlargement of the device and increase in cost may be caused. Therefore, it is desirable that each of the nozzle rows, in a three-dimensional object forming device, is shared among multiple uses as much as possible.

Under such a situation; if a configuration is made as the "Configuration 6" described above, for example, a nozzle row and the like to be shared with another use can be used, at least as a part of a plurality of nozzle rows for forming an ink layer. More concretely to describe, for example, a nozzle row is used and shared for multiple uses. For example, with respect to a nozzle row to discharge coloring ink, the nozzle row is also used for forming a modeling layer or a supporting layer, and the like. According to this configuration as described, for example, the nozzle row provided to the three-dimensional object forming device can be used more efficiently. Moreover, for example, enlargement of the device and increase in cost can properly be controlled.

(Configuration 7) At least one nozzle row among the plurality of nozzle rows is a nozzle row for discharging ink droplets of coloring ink; and at least another nozzle row among the plurality of nozzle rows discharges ink droplets of ink as a material for, either a modeling layer that is an ink layer to constitute an internal section of the three-dimensional object, or a supporting layer that is an ink layer to support a circumference of the three-dimensional object in a forming process.

In the case of a configuration as described above, it is possible to use a nozzle row for coloring, for example, as a part of nozzle rows for forming a modeling layer and a supporting layer. Meanwhile, in a three-dimensional object forming device, usually a plurality of nozzle rows for color ink are required in order to shape, for example, a colored three-dimensional object. Therefore, in this case, a nozzle row originally required for coloring is shared and used for forming a modeling layer or a supporting layer. Then, according to this configuration as described above, for example, the nozzle row provided to the three-dimensional object forming device can be used more efficiently. Moreover, in this way for example, enlargement of the device and increase in cost can be controlled more properly.

(Configuration 8) The plurality of nozzle rows discharge ink droplets of the same ink. According to this configuration as described above, for example, a plurality of ink layers to be laminated and formed on the same area can be formed more uniformly and appropriately.

(Configuration 9) The plurality of nozzle rows discharge ink droplets of coloring ink of the same color. According to this configuration as described above, for example, with respect to the coloring ink, an effect of variation in a discharging performance of nozzles can appropriately be controlled. Moreover accordingly, for example, in the case of forming a colored three-dimensional object, it is possible to appropriately prevent a streak, unevenness, and the like from appearing in an image drawn by way of coloring.

Incidentally, the three-dimensional object forming device forms a colored three-dimensional object, for example, by using of coloring ink of a plurality of kinds which have individually different colors. In this case, the "coloring ink of a plurality of kinds" includes ink of each color, for example, of Y (Yellow), M (Magenta), C (Cyan), and K (Black). In this case, it is preferable that the head unit of the three-dimensional object forming device has a plurality of nozzle rows with respect to the coloring ink of each color.

Moreover, the head unit may further include a nozzle row for discharging ink droplets of a coloring ink of a color other than Y, M, C, and K.

(Configuration 10) A three-dimensional object forming method for forming a three-dimensional object by an additive manufacturing method, the three-dimensional object forming method including: carrying out a main scanning operation by a head unit having at least one inkjet head provided with at least one nozzle row in which at least one nozzle is placed in a predetermined nozzle row direction, in order to discharge ink droplets from the nozzle while the head unit moving in a main scanning direction that intersects with the nozzle row direction; forming a plurality of laminated ink layers by use of the plurality of nozzle rows, on at least some area, by the head unit having a plurality of nozzle rows in total; and discharging an ink droplet to each different position in an operation of forming one of the ink layers by each of the nozzles in the plurality of nozzle rows, and discharging ink droplets in an operation of forming at least any two ink layers, laminated successively, among the plurality of ink layers formed on one area, in such a way that ink dots formed by the same nozzle are not stacked at the same position. According to this configuration as described, for example, the same effect as the "Configuration 1" can be obtained.

According to the present disclosure, an effect of variation in a discharging performance of nozzles can appropriately be controlled, for example, in the case of forming a three-dimensional object by an additive manufacturing method by using an inkjet head.

BRIEF DESCRIPTION OF THE DRAWINGS

FIGS. 1A and 1B are diagrams that show an example of a three-dimensional object forming device 10 according to an embodiment of the present disclosure; wherein.

FIGS. 2A and 2B are diagrams that show an example of a more detailed configuration of a head unit 12; wherein.

FIGS. 3A~3C are diagrams that show an example of an operation of forming a modeling layer by use of a plurality of modeling material heads 204.

FIGS. 4A~4C are diagrams that show another example of an operation of forming a modeling layer by use of a plurality of modeling material heads 204.

FIGS. 5A~5C are diagrams that show an example of an operation of forming a plurality of modeling layers that are laminated successively.

FIGS. 6A~6B are diagrams that show modifications on a configuration of the head unit 12.

DETAILED DESCRIPTION OF EMBODIMENTS

Figure 1A:
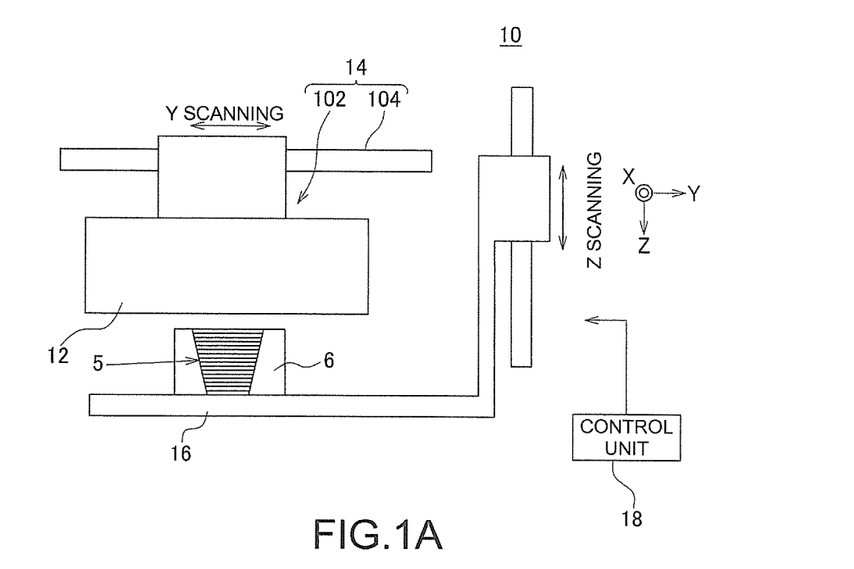
FIG. 1A illustrates an example of a configuration of a key section, with respect to a system configuration of the three-dimensional object forming device 10, and meanwhile
Figure 1B:
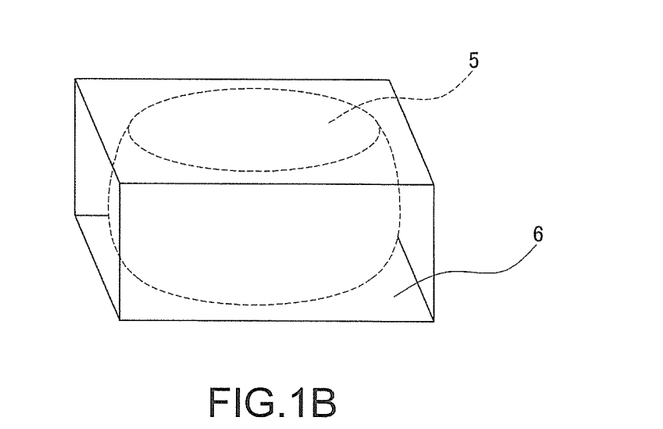
FIG. 1B illustrates an example of a three-dimensional object 5 formed by the three-dimensional object forming device 10.

An embodiment according to the present disclosure is explained below with reference to the drawings. FIGS. 1A~1B are diagrams that show an example of a three-dimensional object forming device 10 according to an embodiment of the present disclosure; wherein, FIG. 1A illustrates an example of a configuration of a key section, with respect to a system configuration of the three-dimensional object forming device 10, and meanwhile FIG. 1B illustrates an example of a three-dimensional object 5 formed by the three-dimensional object forming device 10.

In the present example, the three-dimensional object forming device 10 is a device for forming the three-dimensional object 5 by an additive manufacturing method. In this case, the "additive manufacturing method" is, for example, a method for forming the three-dimensional object 5 by way of laminating a plurality of layers. The "three-dimensional object 5" is, for example, a 3D structural object. Then, in the present example, a method for forming a three-dimensional object may be considered, for example, as a three-dimensional object manufacturing method.

Incidentally, except for the issues described below, the three-dimensional object forming device 10 may have a configuration that is the same as, or similar to what a publicly-known three-dimensional object forming device has. Moreover, the three-dimensional object forming device 10 may be a device, for example, materialized by way of modifying a part of a configuration of a publicly-known inkjet printer. For example, the three-dimensional object forming device 10 may be a device materialized by way of modifying a part of an inkjet printer using ultraviolet curable ink (UV ink) for printing a 2D image.

In the present example, the three-dimensional object forming device 10 includes: a head unit 12, a main scanning drive unit 14, a formation table 16, and a control unit 18. The head unit 12 is a section for discharging liquid droplets (ink droplets) as a material for the three-dimensional object 5; namely to discharge ink droplets of curable resins, i.e., resins that cured in accordance with a predetermined condition; and to cure the resins. Then, the head unit 12 forms each layer that makes up the three-dimensional object 5.

More concretely to describe in the present example, the head unit 12 includes, for example, a plurality of inkjet heads to discharge ink droplets in accordance with a command from the control unit 18. Moreover, for example, ultraviolet curable resins that cured with ultraviolet light irradiation are used as curable resins. In this case, the head unit 12 discharges, for example, ink droplets of ultraviolet curable ink, as ink droplets of a material for the three-dimensional object 5. Then, an ink layer is cured by irradiation of ultraviolet light from an ultraviolet light source.

Furthermore, in the present example, the head unit 12 forms a supporter 6 around the three-dimensional object 5, at a time of forming the three-dimensional object 5, as shown in FIG. 1B. The supporter 6 is a laminated structural object that supports the three-dimensional object 5 by way of surrounding an outer circumference of the three-dimensional object 5 in a forming process; and the supporter 6 is dissolved and removed after forming the three-dimensional object 5 finishes, for example, by use of water.

Incidentally, in the present example, the ink is a liquid, for example, discharged from an inkjet head. Moreover, the inkjet head is a liquid discharging head for discharging a liquid, for example, by means of an inkjet method. The inkjet method is a method of discharging liquid droplets from a nozzle, by activating a drive element, such as a piezo element and the like. Incidentally, a more specific configuration and an operation of the head unit 12 are explained later more in detail.

The main scanning drive unit 14 is a drive section that has the head unit 12 carry out a main scanning operation. In this case, "to have the head unit 12 carry out a main scanning operation" is, for example, "having an inkjet head owned by the head unit 12 carry out a main scanning operation." Moreover, "a main scanning operation" is, for example, an operation of discharging ink droplets while moving in a predetermined main scanning direction (in the Y-direction shown in the drawing).

Incidentally, in the present example, the main scanning drive unit 14 includes: a carriage 102, and a guide rail 104. The carriage 102 is a holding section that holds each inkjet head and the like in the head unit 12, while facing the inkjet head and the like toward the formation table 16. In this case, "holding the inkjet head while facing it toward the formation table 16" is, for example, holding the inkjet head in such a way that a discharging direction of ink droplets is consistent with the direction toward the formation table 16. Incidentally, at a time of a main scanning operation, the carriage 102 moves along the guide rail 104 while holding each inkjet head. The guide rail 104 is a rail-like component for guiding the carriage 102 in its movement, and has the carriage 102 move in accordance with a command from the control unit 18, at the time of a main scanning operation.

Incidentally, a movement of the head unit 12 at the time of a main scanning operation may be a relative movement with respect to the three-dimensional object 5. Therefore, in a modification on the configuration of the three-dimensional object forming device 10; for example, a side of the three-dimensional object 5 may be moved instead by way of moving the formation table 16 in the main scanning direction (in the Y-direction shown in the drawing), while a position of the head unit 12 is kept stationary.

The formation table 16 is a table on which the three-dimensional object 5 in a forming process is installed. In the present example, the formation table 16 has a function for moving its top surface in a vertical direction (in the Z-direction shown in the drawing), and moves the top surface according to a command from the control unit 18, in response to a degree of progress of the forming process for the three-dimensional object 5. Moreover, according to this operation; a distance (gap) between a surface, being formed at the time, of the three-dimensional object 5 in the forming process and the head unit 12 is appropriately adjusted. In this case, the "surface, being formed at the time, of the three-dimensional object 5" is, for example, a surface where the head unit 12 forms a next layer. Incidentally, a scanning operation in the Z-direction (Z-scanning), by way of vertically moving the formation table 16 in relation to the head unit 12, may be carried out instead, for example, by moving a side of the head unit 12.

The control unit 18 is, for example, a CPU of the three-dimensional object forming device 10; and it controls a forming operation for the three-dimensional object 5, by controlling each unit of the three-dimensional object forming device 10, on the basis of data showing the three-dimensional object 5 to be formed (formation data). According to the present example, the three-dimensional object 5 can suitably be formed.

Incidentally, the three-dimensional object forming device 10 may further be provided with various other configurations, for example, required for forming, coloring, and the like on the three-dimensional object 5, in addition to the configuration illustrated in FIG. 1A. For example, the three-dimensional object forming device 10 may further be provided with a sub scanning drive unit and the like, for having the head unit 12 carry out a sub scanning operation. In this case, the "sub scanning operation" is an operation of moving an inkjet head of the head unit 12 in a sub scanning direction (in the X-direction shown in the drawing), for example, perpendicular to the main scanning direction, relatively with respect to the three-dimensional object 5 in a forming process. The sub scanning drive unit has the head unit 12 carry out a sub scanning operation, as required; for example at a time of forming a three-dimensional object 5 having its length in the sub scanning direction being longer than a forming width of an inkjet head of the head unit 12, and the like. Then, more concretely to describe, the sub scanning drive unit may be, for example, a drive unit that transfers the formation table 16 in the sub scanning direction. Furthermore, the sub scanning drive unit may be, for example, a drive unit that transfers the carriage 102 holding the head unit 12 together with the guide rail 104.

Figure 2A:
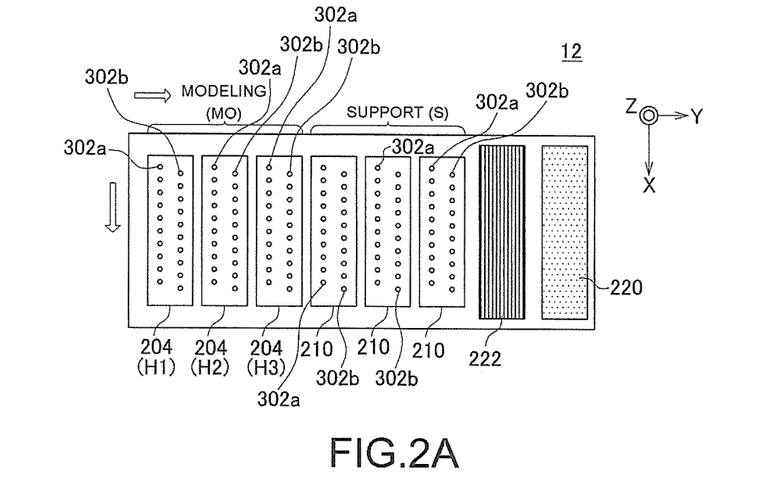
FIG. 2A is a bottom plan view showing an example of a general configuration of the head unit 12, and meanwhile
Figure 2B:
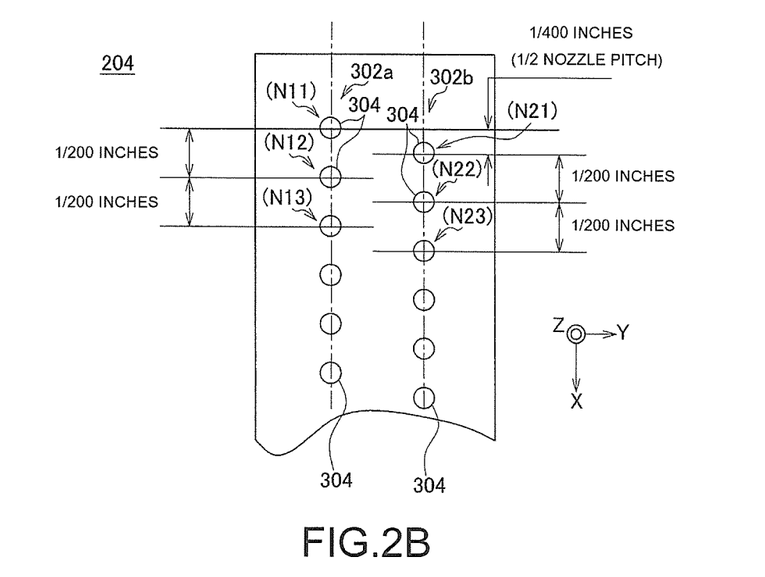
FIG. 2B illustrates an example of a more detailed configuration, with respect to each inkjet head in the head unit 12.

A more concrete configuration and operation of the head unit 12 is explained next. FIGS. 2A and 2B are diagrams that show an example of a more detailed configuration of the head unit 12; wherein, FIG. 2A is a bottom plan view showing an example of a general configuration of the head unit 12, and meanwhile FIG. 2B illustrates an example of a more detailed configuration, with respect to each inkjet head in the head unit 12.

In the present example, the head unit 12 includes: a plurality of modeling material heads 204 (MODELING (MO) as shown in FIG. 2A), a plurality of supporting layer heads 210 (SUPPORT (S) as shown in FIG. 2A), a flattening roller unit 222, and an ultraviolet light source 220. Each of these configurations is placed in a carriage that is an identical supporting member.

Incidentally, the plurality of modeling material heads 204 and the plurality of supporting layer heads 210 are included in an inkjet head, as an example, owned by the head unit 12. For example, a publicly-known inkjet head can appropriately be used as such an inkjet head.

Moreover, in the present example, the plurality of modeling material heads 204 and the plurality of supporting layer heads 210 are inkjet heads having the same characteristics, except for the ink to be used. Each inkjet head (each of the plurality of modeling material heads 204 and the plurality of supporting layer heads 210) in the head unit 12 is installed so as to be placed side by side in the main scanning direction (in the Y-direction), while being aligned so as to have the same position in the sub scanning direction (in the X-direction). Then, each inkjet head discharges ink droplets of ultraviolet curable ink that is cured by irradiation of ultraviolet light.

The plurality of modeling material heads 204 are inkjet heads that discharge ink droplets of modeling ink ("MO" ink) for the three-dimensional object 5. In this case, the modeling ink is, for example, ink for forming a forming layer (modeling layer) that is an ink layer to constitute at least an internal section of the three-dimensional object. In this case, the modeling layer may be, for example, an ink layer to constitute an essential part and the like of the three-dimensional object 5. In the meantime, the plurality of modeling material heads 204 form the three-dimensional object 5 (refer to FIG. 1B), for example, by way of laminating and forming a plurality of modeling layers.

Incidentally, for example, ink specialized for a forming process, with a predetermined color, can be used as the modeling ink. Moreover, it is also possible, for example, to use white ink, clear ink, or the like as the modeling ink. Furthermore, for example, in the case where a three-dimensional object with a colored surface is formed, the modeling ink may be ink to be used for forming an internal section of the three-dimensional object. Still further, for example, in the case where a three-dimensional object is formed only with modeling ink, not by way of using any ink for coloring, the modeling layer may be each layer for constituting an entire section of the three-dimensional object. Incidentally, reference symbols H1 through H3 individually assigned to the modeling material heads 204, as shown in FIG. 2A, are those to be used for later explanation by way of identifying each of the modeling material heads 204.

The plurality of supporting layer heads 210 are inkjet heads for forming a supporting layer that is an ink layer to support a circumference of the three-dimensional object 5 in a forming process, and the inkjet heads discharge droplets of ink containing a material for the supporting layer (S). Then, the plurality of supporting layer heads 210 form the supporter 6 (refer to FIG. 1B) by way of laminating and forming a plurality of supporting layers.

Incidentally, for example, a publicly-known material for a supporter can appropriately be used as a material for the supporter 6. In the present example, it is possible, for example, to use a water-soluble material, which can be dissolved by water after forming the three-dimensional object 5, as the material for the supporter 6. Meanwhile, since the material for the supporter 6 is removed after the forming process, it is preferable to use a material, which is less harden-able with ultraviolet and easily decomposable than a formed material is, as the material for the supporter 6. According to such a configuration, for example, a forming process by use of the supporter 6 can be carried out more appropriately.

The ultraviolet light source 220 is a light source of ultraviolet for curing ultraviolet curable ink. It is preferable to use, for example, an ultraviolet LED as the ultraviolet light source 220. Moreover, it is also possible to use a metal halide lamp, a mercury lamp, and the like, as the ultraviolet light source 220.

Meanwhile, in the present example, the ultraviolet light source 220 is installed at one side in the main scanning direction, with respect to an arrangement of the plurality of modeling material heads 204 and the plurality of supporting layer heads 210. Thus, the ultraviolet light source 220 irradiates an ink layer with ultraviolet at the timing predetermined according to a layout of the inkjet heads and the ultraviolet light source 220, in the time of a main scanning operation.

More specifically to describe, in the case of a configuration shown in FIG. 2A; when a main scanning operation is carried out, for example, in such a way as to move in a rightward direction in the drawing, the ultraviolet light source 220 irradiates an area, to which the modeling material heads 204 and the supporting layer heads 210 have not yet discharged ink droplets through the current main scanning operation at the time, with ultraviolet light. Therefore, in this case, the ultraviolet light source 220 irradiates, for example, an ink layer already formed before the main scanning operation at the time, with ultraviolet light.

In the meantime, when a main scanning operation is carried out, for example, in such a way as to move in a leftward direction in the drawing, the ultraviolet light source 220 irradiates an area, to which the modeling material heads 204 and the supporting layer heads 210 have already discharged ink droplets through the current main scanning operation at the time, with ultraviolet light. Therefore, in this case, the ultraviolet light source 220 irradiates, for example, an ink layer that has been formed through the main scanning operation at the time, with ultraviolet light.

Moreover, the three-dimensional object forming device 10 may have the head unit 12 carry out, for example, a both-way main scanning operation. In this case, through each main scanning operation in an outward direction (for example, in the rightward direction in the drawing) and a homeward direction (for example, in the leftward direction in the drawing), an operation at the time of the main scanning operation in each direction described above is carried out. According to the configuration described above, for example, an ink layer formed by the modeling material heads 204 and the supporting layer heads 210 can appropriately be irradiated with ultraviolet light.

Incidentally, in a modification on the configuration of the head unit 12, for example, multiple ultraviolet light sources 220 may be provided to the head unit 12. In this case, each of the multiple ultraviolet light sources 220 is placed, for example, at one end side and the other end side of the head unit 12 in the main scanning direction.

The flattening roller unit 222 is a configuration for flattening an ink layer formed during a forming process of the three-dimensional object 5. In the present example, the flattening roller unit 222 is placed between an arrangement of the plurality of modeling material heads 204 and the plurality of supporting layer heads 210, and the ultraviolet light source 220. Thus, the flattening roller unit 222 flattens an ink layer at the timing predetermined according to a layout of the inkjet heads and the ultraviolet light source 220, and the flattening roller unit 222 in the time of a main scanning operation.

Incidentally, more specifically to describe; for example, a configuration including a roller and the like for scraping ink in a liquid state before hardening can appropriately be applied as the flattening roller unit 222. In this case, it is possible that, for example, in the main scanning operation of moving in a leftward direction in the drawing, a flattening operation is carried out for an ink layer formed by the modeling material heads 204 and the supporting layer heads 210, before the ultraviolet light source 220 irradiates the ink layer with ultraviolet.

According to the configuration described above, the three-dimensional object forming device 10 forms a modeling layer and a supporting layer by use of the head unit 12. Moreover, by way of laminating and forming modeling layers and supporting layers, the three-dimensional object 5 is formed, while being supported by the supporter 6.

A more detailed configuration of each inkjet head in the head unit 12 is explained next. Each inkjet head in the head unit 12 has individually a plurality of nozzle rows 302a and 302b, for example, in a surface that faces the formation table 16 (refer to FIG. 1A). In this case, the "nozzle row" is, for example, a column in which nozzles are placed in a nozzle row direction specified preliminarily. Meanwhile, in the present example, each of the nozzle rows 302a and 302b is a row of multiple nozzles 304 arranged at a constant nozzle pitch in the nozzle row direction being parallel with the sub scanning direction (in the X-direction), as shown in FIG. 2B. In the illustrated case, the nozzle pitch is 1/200 inches.

Moreover, each of the nozzles 304 in the nozzle row 302a, and each of the nozzles in the nozzle row 302b are arranged in such a way that their positions in the sub scanning direction are displaced from each other for half the nozzle pitch (½ nozzle pitch). In the illustrated case, half the nozzle pitch is 1/400 inches. Then, more concretely to describe, for example if a plurality of nozzles 304 constituting the nozzle row 302a are individually identified as N11, N12, N13, . . . in due order from a top side in the drawing, these nozzles 304 are arranged in this order, in the sub scanning direction at constant intervals (nozzle pitch). In the meantime, if a plurality of nozzles 304 constituting the nozzle row 302b are individually identified as N21, N22, N23, . . . in due order from a top side in the drawing, these nozzles 304 are arranged in this order, in the sub scanning direction at constant intervals (nozzle pitch). Then, with regard to positions in the sub scanning direction, a position of the N21-st nozzle 304 in the nozzle row 302b is located at a middle position between the N11-th nozzle 304 and the N12-th nozzle 304 in the nozzle row 302a.

Therefore, according to this configuration; in relation to a resolution (forming resolution) at which ink droplets are discharged, for example, in one-time main scanning operation, the resolution in the sub scanning direction becomes two times a resolution corresponding to the nozzle pitch. More concretely to describe, in the case where a resolution corresponding to the nozzle pitch in a nozzle row (each of the nozzle rows 302a and 302b) is, for example, 200 dpi, a forming resolution in the sub scanning direction becomes 400 dpi by way of discharging ink droplets with both of the nozzle rows 302a and 302b moving in the main scanning direction. Therefore, according to this configuration, a high-resolution forming process can appropriately be carried out.

In the meantime, as already explained above, the head unit 12 of the present example has a plurality of inkjet heads for each of the modeling material heads 204 and the supporting layer heads 210. Then, as shown in FIG. 2B, each inkjet head includes a plurality of nozzle rows 302a and 302b. Therefore, when a configuration of the head unit 12 of the present example is described more generally, it can also be said that the head unit 12 has a configuration for forming a modeling layer by a plurality of nozzle rows and forming a supporting layer by a plurality of nozzle rows. According to the present example, each of the modeling layer and the supporting layer can appropriately be formed by using a plurality of nozzles.

Incidentally, in this case, the "plurality of nozzle rows in the head unit 12" are, for example, a plurality of nozzle rows to be used for the same intended uses (for example, for a modeling layer or a supporting layer). Moreover, the "plurality of nozzle rows" may be a plurality of nozzle rows in which nozzle positions in the sub scanning direction are the same. More specifically to describe, "forming a modeling layer or a supporting layer by using a plurality of nozzle rows" may be, for example, forming a modeling layer or a supporting layer by using the plurality of nozzle rows 302a and the plurality of nozzle rows 302b.

Moreover, in each inkjet head, it is also possible to image a virtual nozzle row materialized by integrating a nozzle row 302a and a nozzle row 302b. In this case, the "virtual nozzle row" is a nozzle row as a result of virtually integrating a nozzle row 302a and a nozzle row 302b. In this case, the nozzles are placed in the sub scanning direction at an interval, which is half of the nozzle pitch in each of the nozzle rows 302a and the nozzle rows 302b, in the virtual nozzle row. Then, in this case, "forming a modeling layer or a supporting layer by using a plurality of nozzle rows" can be imaged, for example, as forming a modeling layer or a supporting layer by individually using a plurality of such virtual nozzle rows.

Moreover, a nozzle row direction, in which nozzles of a nozzle row are placed, may intersect at an angle that is not a right angle, with respect to the main scanning direction. For example, in the case where a nozzle row direction is in parallel with a first direction predetermined, the head unit 12 may carry out a main scanning operation, while using a second direction being at a predetermined angle to the first direction, as a main scanning direction. Meanwhile, in this case, it is possible, for example, to use an inkjet head in which a plurality of nozzles are arranged in a direction slanted with respect to the main scanning direction.

Incidentally, in the above description, illustrated is a configuration in the case where the inkjet heads owned by the head unit 12 are only the modeling material heads 204 and the supporting layer heads 210, in order to simplify explanation. In this case, the three-dimensional object forming device 10 (refer to FIG. 1A) forms the three-dimensional object 5 that is not colored, for example, on the basis of shape information of a 3D structural object, which shows a form of the three-dimensional object 5.

Nevertheless, in a modification on the configuration of the head unit 12, an inkjet head of any other type may be further provided to the head unit 12. For example, the head unit 12 may further be provided with an inkjet head (a coloring head) and the like that discharge ink droplets of colored ink, such as color ink and so on. Moreover, an inkjet head and the like, for clear ink or white ink, may further be provided.

Next, a main scanning operation to be carried out in the present example is explained, in relation to a more specific operation of the head unit 12. As already explained above, the head unit 12 has the plurality of modeling material heads 204 in the present example. Furthermore, according to this arrangement, the head unit 12 is provided with a plurality of nozzle rows in total, for forming a modeling layer.

Then, in an operation of forming the three-dimensional object 5, the head unit 12 laminates and forms a plurality of modeling layers by use of the plurality of nozzle rows, on at least some area. Moreover, in this case, each nozzle in the plurality of nozzle rows of the plurality of modeling material heads 204 discharges an ink droplet to each different position, in an operation of forming one modeling layer.

Furthermore, in an operation of forming at least any two modeling layers, laminated successively, among a plurality of modeling layers formed on one area; ink droplets are discharged in such a way that ink dots formed by the same nozzle are not stacked at the same position. In this case, "the same position" is, for example, a landing position where position data in the X-coordinate system and the Y-coordinate system are the same. Moreover, in this case, it is preferable that ink droplets are discharged by each nozzle in the plurality of nozzle rows in such a way that ink dots formed by the same nozzle are not stacked at the same position, in an operation of forming any two modeling layers laminated successively as well, not only some modeling layers.

Incidentally, this operation can also be explained in other words, for example, as an operation; in which one modeling layer is formed in such a way that ink droplets from each nozzle in a plurality of nozzle rows are discharged so as not to be stacked at the same position, in one main scanning operation; and furthermore, at least in some adjacent modeling layers, ink droplets discharged from the same nozzle in a plurality of nozzle rows are not stacked at the same position. Moreover, with respect to a selection of a nozzle that discharges an ink droplet to each position in ink layers laminated successively, this operation can also be dealt with as a method for displacing the nozzle in a direction perpendicular to the nozzle row direction.

Furthermore, in the present example, a supporting layer in addition to a modeling layer is also formed by the same operation as described above. More concretely to describe, as already explained above; the head unit 12 in the present example is provided with a plurality of nozzle rows in total, for forming a supporting layer. Then, also in an operation for forming a supporting layer, by using a plurality of nozzle rows in the same way as described above; in an operation of forming at least any two supporting layers, laminated successively, ink droplets are discharged in such a way that ink dots formed by the same nozzle are not stacked at the same position. Also, in this case, it is preferable that ink droplets are discharged in such a way that ink dots formed by the same nozzle are not stacked at the same position, in an operation of forming any two supporting layers laminated successively as well, not only some supporting layers.

Next, the above operation is more specifically explained with reference to the drawings. An operation described below is an example of an operation of forming a modeling layer by using a plurality of nozzle rows included in the plurality of modeling material heads 204. Then, although a detailed explanation is skipped, a supporting layer can be formed by a similar operation, in the case of forming a supporting layer by using a plurality of nozzle rows included in the plurality of supporting layer heads 210.

Figure 3A:
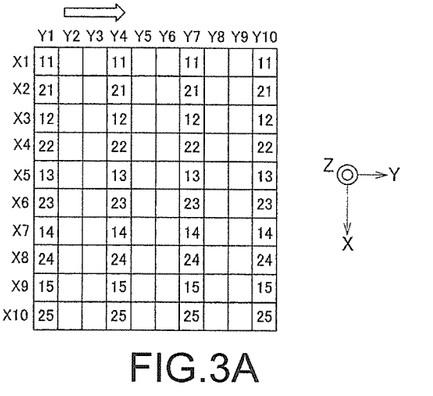
FIG. 3A through FIG. 3C show an example of positions where ink droplets are discharged by each of first through third modeling material heads 204 (the first through third heads) in the plurality of modeling material heads 204.
Figure 3B:
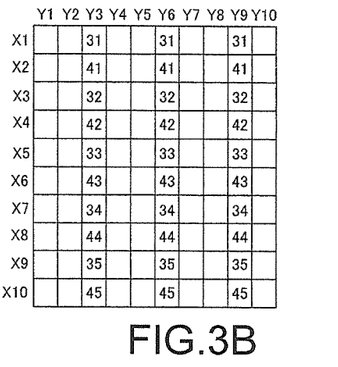
Figure 3C:
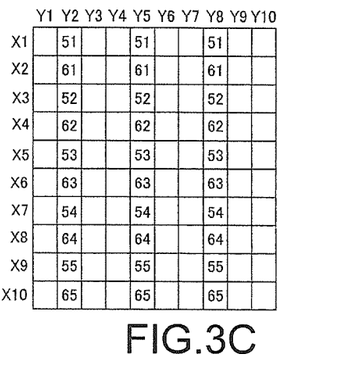

FIGS. 3A~3C are diagrams that show an example of an operation of forming a modeling layer by use of the plurality of modeling material heads 204, and the drawing shows an example of positions to which ink droplets are discharged from each nozzle in each of the modeling material heads 204 in one main scanning operation. FIG. 3A through FIG. 3C show an example of positions where ink droplets are discharged by each of the first through third modeling material heads 204 (the first through third heads) in the plurality of modeling material heads 204. The first through third modeling material heads 204 are, for example, the modeling material heads 204 that are assigned with the symbols H1 through H3, respectively, shown in FIG. 2A.

Meanwhile, in FIGS. 3A~3C, each box represents a position where an ink droplet should be discharged in order to form one modeling layer (a record position with the ink droplet in the layer). More concretely to describe; for example, if a forming process is carried out with a resolution of 400 dpi, each box represents an X-Y coordinate position partitioned at a pitch of ¹/₄₀₀ inches. Then, with respect to a plurality of modeling layers to be laminated and formed, boxes at the same position (an X-Y coordinate position) in each layer are stacked in the Z-direction.

Incidentally, in the present example, the modeling material heads 204 discharge ink droplets according to the formation data, while moving in the main scanning direction (the Y-direction). Then, in this case, one modeling layer is formed by using the three modeling material heads 204, and therefore one of the modeling material heads 204 only has to discharge ink droplets to one third of an area of the one modeling layer. Therefore, in the case shown in each of FIG. 3A through FIG. 3C, each of the modeling material heads 204 discharges ink droplets at intervals of three pitches in the Y-direction.

In the meantime, a numeral in each box shows a number representing a nozzle row (a nozzle row number) and a number representing a nozzle position in the nozzle row (a nozzle serial number). Incidentally, an empty box in each of FIG. 3A through FIG. 3C represents a position being independent from the formation data, and the corresponding modeling material head 204 discharges no ink droplet at the position.

Incidentally, in the present example, the nozzle row number is a numeral provided for identifying each of the plurality of nozzle rows included in the plurality of modeling material heads 204. Meanwhile, the nozzle serial number is a numeral provided for identifying each of the plurality of nozzles arranged in a nozzle row.

More specifically to describe, in the present example, each of the modeling material heads 204 includes two nozzle rows 302*a* and 302*b*, as already explained with reference to FIGS. 2A~2B and the like. Then, in this case, for example, the nozzle row 302*a* that is one of the nozzle rows in the first modeling material head 204 (H1) is provided with a nozzle row number '1.' In the meantime, the nozzle row 302*b* that is the other of the nozzle rows is provided with a nozzle row number '2.' Then, the nozzle row 302*a* and the nozzle row 302*b* in the second modeling material head 204 (H2) are provided with nozzle row numbers '3' and '4', respectively. Furthermore, the nozzle row 302*a* and the nozzle row 302*b* in the third modeling material head 204 (H3) are provided with nozzle row numbers '5' and '6', respectively. Then, the nozzles in each nozzle row are individually provided with a nozzle serial number from '1' in due order from an end at one side.

When each nozzle is provided with a numeral in the way described above, for example, an 'n'-th nozzle from an end at one side (the 'n'-th nozzle) in a nozzle row with a nozzle row number 'L' can be identified by using a specific numeral 'Ln.' More concretely to describe, for example, in the nozzle row 302*a* of the second modeling material head 204, which is a nozzle row provided with a nozzle row number '3', a second nozzle from the end can be denoted by using a numeral '32.'

In the meantime, as understood according to the above explanation regarding the nozzle row number and the nozzle serial number, the matters illustrated in FIGS. 3A~3C, and the like; in order to form a modeling layer as shown in FIG. 3A through FIG. 3C, ink droplets are discharged to each different position from each nozzle of the plurality of nozzle rows included in the plurality of modeling material head 204, in the operation for forming one modeling layer. According to this configuration, for example, by way of forming one modeling layer with the plurality of nozzle rows, a three-dimensional object can be formed even faster.

Figure 4A:
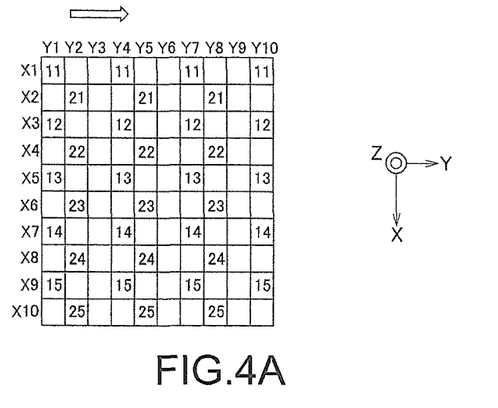
FIG. 4A through FIG. 4C show an example of positions where ink droplets are discharged by each of first through third modeling material heads 204 in the plurality of modeling material heads 204.
Figure 4B:
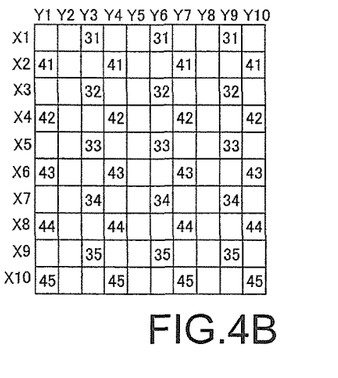
Figure 4C:
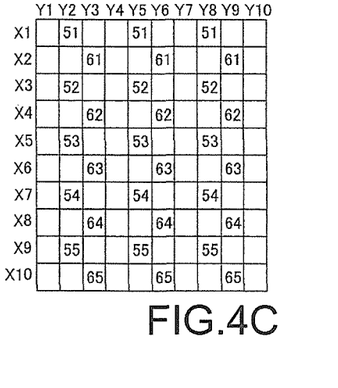

Moreover, a forming process of a modeling layer by using the plurality of modeling material head 204 is not limited to the method illustrated in FIGS. 3A~3C, and it is possible to apply another method for the process. FIGS. 4A~4C are diagrams that show another example of an operation of forming a modeling layer by use of a plurality of modeling material heads 204. FIG. 4A through FIG. 4C show an example of positions where ink droplets are discharged by each of the first through third modeling material heads 204 in the plurality of modeling material heads 204. Incidentally, an operation shown in FIGS. 4A~4C is either the same as or similar to the operation shown in FIGS. 3A~3C, except for the points described below. For example, each box and a numeral in the box shown in FIGS. 4A~4C show the same matters as shown in FIGS. 3A~3C.

Also in the operation that FIGS. 4A~4C shows, for example, ink droplets are discharged to each different position from each nozzle of the plurality of nozzle rows included in the plurality of modeling material head 204, in the operation for forming one modeling layer. Moreover, by way of forming one modeling layer with the plurality of nozzle rows, for example, a three-dimensional object can be formed even faster.

Moreover, in the operation shown in FIGS. 3A~3C; with respect to the positions to which ink droplets are discharged from each nozzle of the two nozzle rows in one modeling material head 204 in one main scanning operation, the ink droplets are discharged in such a way that their positions in the Y-direction are made the same so as to be lined in the X-direction. On the other hand, in the operation shown in FIGS. 4A~4C; with respect to relationships in one modeling material head 204 between the positions to which ink droplets are discharged from each nozzle of one nozzle row, and the positions to which ink droplets are discharged from each nozzle of the other nozzle row, their positions in the Y-direction are different from each other. Therefore, in this case, with respect to the positions to which ink droplets are discharged from the two nozzle rows in the one modeling material head 204 in one main scanning operation, the positions are not lined up in one row.

Then, in this case, for example, even though there arises variation with respect to a discharging amount of ink droplets within the plurality of modeling material heads 204, an effect of the variation can appropriately be reduced. Therefore, according to this configuration, for example, a more uniform modeling layer can appropriately be formed. Furthermore, accordingly, in the case of laminating a plurality of modeling layers, for example, a height after a laminating process can be made more uniform.

Incidentally, an example of an operation of forming a single ink layer is explained above with reference to FIGS. 3A~3C and FIGS. 4A~4C. Next, an example of an operation of laminating and forming a plurality of ink layers is concretely explained. As already explained with reference to FIGS. 1A~1B, FIGS. 2A~2B and the like; in the present example of an operation of forming at least any two modeling layers, laminated successively, ink droplets are discharged in such a way that ink dots formed by the same nozzle are not stacked at the same position.

Figure 5A:
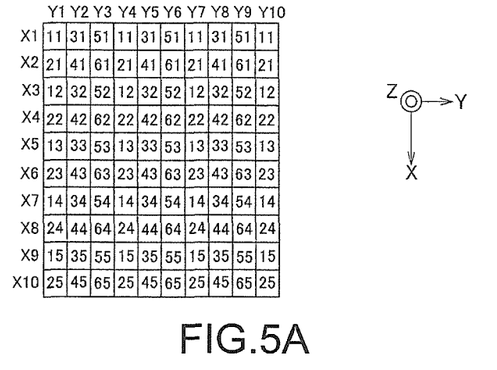
FIG. 5A shows a nozzle row number and a nozzle serial number corresponding to a nozzle for discharging an ink droplet for each position, with respect to a case for forming an 'n'-th modeling layer (an 'n'-th layer) (wherein, the 'n' is an integer equal to or greater than 1).
Figure 5B:
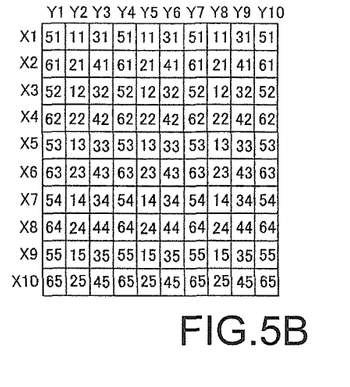
FIG. 5B shows a nozzle row number and a nozzle serial number corresponding to a nozzle for discharging an ink droplet for each position, with respect to a case for forming an 'n+1'-th modeling layer (an 'n+1'-th layer).
Figure 5C:
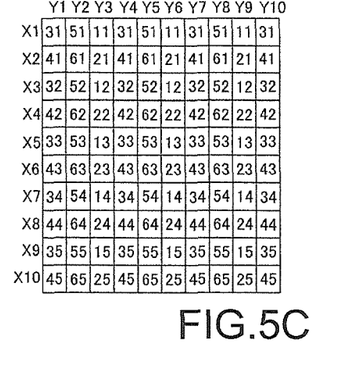
FIG. 5C shows a nozzle row number and a nozzle serial number corresponding to a nozzle for discharging an ink droplet for each position, with respect to a case for forming an 'n+2'-th modeling layer (an 'n+2'-th layer).

FIGS. 5A~5C are diagrams that show an example of an operation of forming a plurality of modeling layers that are laminated successively. FIG. 5A shows a nozzle row number and a nozzle serial number corresponding to a nozzle for discharging an ink droplet for each position, with respect to a case for forming an 'n'-th modeling layer (an 'n'-th layer) (wherein, the 'n' is an integer equal to or greater than 1). FIG. 5B shows a nozzle row number and a nozzle serial number corresponding to a nozzle for discharging an ink droplet for each position, with respect to a case for forming an 'n+1'-th modeling layer (an 'n+1'-th layer). FIG. 5C shows a nozzle row number and a nozzle serial number corresponding to a nozzle for discharging an ink droplet for each position, with respect to a case for forming an 'n+2'-th modeling layer (an 'n+2'-th layer).

Incidentally, in the operation shown in FIGS. 5A~5C, a main scanning operation at each time is carried out, for example, in the same way as, or in a similar way to the operation explained with reference to FIGS. 3A~3C. More concretely to describe, in the case that FIGS. 5A~5C shows, ink droplets are discharged by each modeling material head 204, at intervals of three pitches in the Y-direction, in one main scanning operation. Moreover, with respect to the positions to which the ink droplets are discharged from each nozzle of the two nozzle rows in one modeling material head 204, the ink droplets are discharged in such a way that their positions in the Y-direction are made the same so as to be lined in the X-direction.

Moreover, with respect to two modeling layers laminated successively, ink droplets are placed in such a way that ink dots formed by the same nozzle are not stacked at the same position, as shown in the drawing. More specifically to describe; when a position corresponding to a box with, for example, an X-direction position being 'X3' and a Y-direction position being 'Y5' is focused, an ink droplet is discharged from a nozzle with a nozzle row number '3' and a nozzle serial number '2' at a time of forming the 'n'-th layer. Then, an ink droplet is discharged from a nozzle with a nozzle row number '1' and a nozzle serial number '2' at a time of forming the 'n+1'-th layer. Furthermore, an ink droplet is discharged from a nozzle with a nozzle row number '5' and a nozzle serial number '2' at a time of forming the 'n+2'-th layer. As a result, for the position corresponding to the box, in the 'n'-th layer through the 'n+2'-th layer laminated in the Z-direction; the ink droplets are discharged from three different nozzles. Moreover, as understood from the drawing, the same is said to other positions of boxes with other coordinates.

Meanwhile, in the case of forming a three-dimensional object by using an inkjet head, it is difficult to prevent variation with respect to a discharging performance of nozzles from arising in a certain range. Therefore, if ink droplets from the same nozzle are discharged and stacked on the same position, it is possible that a position formed by a nozzle with a higher discharging volume becomes thicker in a thickness of modeling layers (a thickness in the Z-direction). Moreover, it is possible that a position formed by a nozzle with a lower discharging volume contrarily becomes thinner in a thickness of the modeling layers. Then, as a result, uneven are caused as a whole, so as to bring a risk that a forming accuracy of the modeling layers becomes deteriorated.

In the meantime, according to the present example, it is possible to appropriately control accumulation of an effect of variation in a discharging performance of nozzles at the same position in the X-Y coordinate system, for example, in a foundation part and the like of a three-dimensional object to be formed with modeling layers. Moreover, thus the variation in thickness can be controlled to form the ink layers with a high degree of accuracy, for example, in the thickness direction (the Z-direction) in which the ink layers are laminated. Therefore, according to the present example, an effect of variation in a discharging performance of nozzles can appropriately be controlled, for example, in the case of forming a three-dimensional object by an additive manufacturing method by using an inkjet head. Moreover, thus, for example, the three-dimensional object can appropriately be formed with a high degree of accuracy.

Furthermore, as explained also in the above, the operation explained with reference to FIGS. 3A~3C through FIGS. 5A~5C, and the like can also be applied to an operation for forming supporting layers by use of the supporting layer heads 210. Then, in this case for example, with respect to the supporting layers, an effect of variation in a discharging performance of nozzles can appropriately be controlled.

Moreover, thus it is possible to form a three-dimensional object more appropriately with a high degree of accuracy.

Incidentally, the number of nozzle rows to be used for forming the modeling layers and the supporting layers is not limited to the configuration explained above. For example, it is possible that a greater number of nozzle rows results in a higher degree of accuracy in a forming operation. Moreover, with respect to the number of nozzle rows and the like, provided in one inkjet head, another configuration different from the illustrated configuration may be used. For example, as each inkjet head, it is possible to use an inkjet head having a plurality of nozzle rows provided with the same nozzle positions in the sub scanning direction.

Furthermore, with respect to ink to be used, using another type of ink, which is not ultraviolet curable ink, and the like is possible. For example, applied may be a method of forming a three-dimensional object, in which hot-melt type ink softened by heating is discharged by an inkjet head and cooled down to normal temperature at a time of lamination, so as to become solidified. Moreover, it is possible to form a three-dimensional object, and the like, not by way of forming the three-dimensional object directly with ultraviolet curable ink, but by way of discharging bond material ink to a powder material. In this case, each inkjet head in the head unit 12 discharges the bond material ink, for example, to the powder material as a base material. Then, more specifically to describe, in the case of forming a modeling layer, it is possible to use, for example, bond material ink for a modeling layer, as the bond material ink. Furthermore, in the case of forming a colored three-dimensional object, it is possible to use, for example, bond material ink for coloring.

Incidentally, a modification can also be conceived, for example, with respect to a configuration, an operation and the like, of the head unit 12. More concretely to describe; explained in the above is a configuration in the case of using the head unit 12 provided with the three modeling material heads 204 and the three supporting layer heads 210, as an example of a configuration of the three-dimensional object forming device 10. Nevertheless, for example, a configuration of the head unit 12, an operation of the three-dimensional object forming device 10 by use of the head unit 12, and the like are not limited to those described above, and various modifications can also be applied. Then, a modification on the configuration of the head unit 12 is explained below.

Figure 6A:
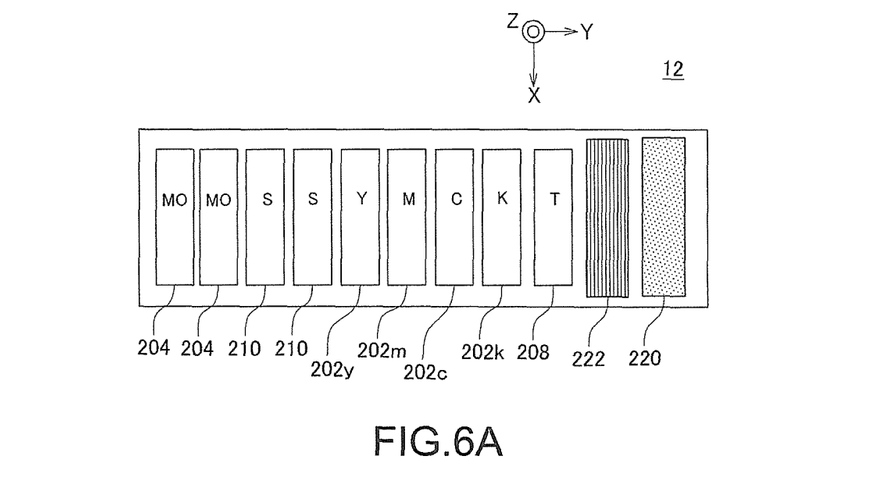
FIG. 6A shows an example of a configuration in a modification of the head unit 12.
Figure 6B:
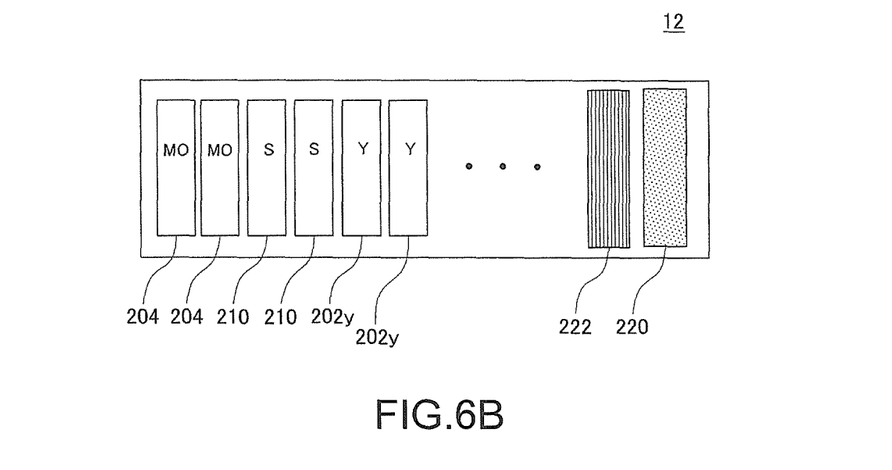
FIG. 6B shows another example of a configuration in a modification of the head unit 12.

FIGS. 6A~6B are diagrams that show modifications on the configuration of the head unit 12. Incidentally, except for the points described below; a configuration in FIGS. 6A~6B, having the same reference symbol as shown in FIGS. 1A~1B through FIGS. 5A~5C, has the same or similar characteristics that a corresponding configuration in FIGS. 1A~1B through FIGS. 5A~5C has.

FIG. 6A shows an example of a configuration in a modification of the head unit 12. In the above descriptions; a configuration in the case, where inkjet heads, owned by the head unit 12, are only the modeling material heads 204 and the supporting layer heads 210, is explained with reference to FIGS. 1A~1B through FIGS. 5A~5C, in order to simplify the explanation. Nevertheless, it is also possible to use a configuration, further including an inkjet head other than the modeling material heads 204 and the supporting layer heads 210, as the head unit 12. For example, in the case shown in FIG. 6A, the head unit 12 includes a plurality of coloring heads 202$y$, 202$m$, 202$c$, and 202$k$ (hereinafter, described as the coloring head 202$y$ through the coloring head 202$k$), and a clear ink head 208, in addition to the modeling material heads 204 and the supporting layer heads 210. Except for an issue on ink to be used, the coloring head 202$y$ through the coloring head 202$k$ and the clear ink head 208 may have the same or similar characteristics, for example, as the modeling material heads 204 have.

The coloring head 202$y$ through the coloring head 202$k$ are inkjet heads that form an area to be colored in a predetermined color (a coloring area), by use of coloring ink, in the three-dimensional object 5; and those inkjet heads individually discharge ink droplets of colored ink of each different color. More specifically to describe, the coloring head 202$y$ through the coloring head 202$k$ individually discharge ink droplets of ultraviolet curable ink, for example, of each color of Y (Yellow), M (Magenta), C (Cyan), and K (Black). In the meantime, the clear ink head 208 is an inkjet head for clear ink that is ink of clear color (transparent); and the clear ink head 208 discharges ink droplets of the clear ink of ultraviolet curable type.

Moreover, while using the coloring head 202$y$ through the coloring head 202$k$ and the clear ink head 208 in addition, the three-dimensional object forming device 10 (refer to FIGS. 1A and 1B) forms a three-dimensional object 5, at least whose surface is colored, for example, according to a datum showing the three-dimensional object 5 to be formed. In this case, the three-dimensional object forming device 10 forms a 3D structural object, at least whose surface is colored; for example, while using shape information and color image information of the 3D structural object. According to this configuration, for example, a colored three-dimensional object can appropriately be formed by further using coloring ink.

Incidentally, the coloring head 202$y$ through the coloring head 202$k$ are an example of inkjet heads for each color of process colors. Moreover, each color of Y, M, C, and K is an example of each of the process colors. The head unit 12 may further be provided, for example, with inkjet heads for pale colors of those colors, as well as R (Red), G (Green), B (Blue), Orange, and the like, as coloring heads.

Moreover, together with the coloring head 202$y$ through the coloring head 202$k$, the clear ink head 208 discharges ink droplets of clear ink, for example, to a coloring area to be colored in a three-dimensional object, for an adjustment to keep an ink volume per unit capacity constant. In this case, the clear ink head 208 discharges the clear ink in such a way, for example, as to make up for a difference in the ink volume discharged from the coloring head 202$y$ through the coloring head 202$k$. The "difference in the ink volume discharged from the coloring head 202$y$ through the coloring head 202$k$" is, for example, a difference in the ink volume per unit capacity, which arises according to a difference in color at each position. According to this configuration, it is possible to keep a total capacity of the color ink and the clear ink approximately constant, for example, at each position in the coloring area. Moreover, thus it is possible to form and color the three-dimensional object with a higher degree of accuracy.

Moreover, in accordance with a configuration of a three-dimensional object to be formed, the head unit 12 may further include, for example, a white ink head that is an inkjet head for white ink, and the like. In this case, the white ink head discharges ink droplets of white ultraviolet curable ink, for example, between a coloring area and a modeling area, in order to enable coloring by means of subtractive color mixing. Except for an issue on ink to be used, the white ink head may have the same or similar characteristics, as the modeling material heads 204 have.

Meanwhile, explained with reference to FIGS. 1A~1B through FIGS. 5A~5C is a case in which the numbers of the modeling material heads 204 and the supporting layer heads 210, which the head unit 12 has, are each three. Nevertheless, for example, in the case of forming two modeling layers or two supporting layers which are laminated successively; as far as it is possible that ink dots formed by the same nozzle are not stacked at the same position, the numbers of the modeling material heads 204 and the supporting layer heads 210 may be any number other than three. For example, in the case shown in FIG. 6A, the head unit 12 has two modeling material heads 204 and two supporting layer heads 210 individually. Even in such a configuration, an effect of variation in a discharging performance of nozzles can appropriately be controlled. Moreover, thus it is possible to appropriately shape a three-dimensional object with a high degree of accuracy.

Furthermore, in the configuration shown in FIGS. 1A~1B through FIGS. 5A~5C, the plurality of modeling material heads 204 to use the same ink are applied as a plurality of nozzle rows for forming a modeling layer; and meanwhile, the plurality of supporting layer heads 210 to use the same ink are applied as a plurality of nozzle rows for forming a supporting layer. Then, accordingly ink droplets of the same ink are discharged by the plurality of nozzle rows for forming the modeling layer; and meanwhile, ink droplets of the same ink are discharged by the plurality of nozzle rows for forming the supporting layer. According to such a configuration, for example, a plurality of ink layers to be laminated and formed on the same area can be formed more uniformly and appropriately.

On the other hand, in a modification on the configuration of the head unit 12; it is possible that, for example, at least as a part of nozzle rows among the plurality of nozzle rows for forming a modeling layer or a supporting layer, nozzle rows for discharging ink droplets of another kind of ink being different from the ink of the other nozzle rows are used. In this case, the "another kind of ink being different" is a kind of ink that is different, for example, in a color or a use application. Then, "a use application" of the ink is a proper use of the ink (e.g., for a modeling layer, for a supporting layer, for coloring, and the like).

More concretely to describe, for example, it is possible that a modeling layer is formed by additionally using at least some of the head 202y through the coloring head 202k besides the modeling material heads 204. In this case, in the configuration; a nozzle row for discharging ink droplets of coloring ink (a nozzle row for coloring) is used, at least as one nozzle row among a plurality of nozzle rows to be used for forming a modeling layer; and moreover a nozzle row for discharging ink droplets of modeling ink is used, at least as another nozzle row. Still further, it is possible that a supporting layer is formed by additionally using at least some of the head 202y through the coloring head 202k besides the supporting layer heads 210.

Then, there is also a risk that enlargement of the machine and increase in cost may be caused, if the number of nozzle rows to be used for forming a modeling layer and a supporting layer becomes great in a three-dimensional object forming device. Therefore, sometimes it is desirable that each of the nozzle rows, in a three-dimensional object forming device, is shared among multiple uses as much as possible.

With respect to the viewpoint, such a configuration makes it possible to use and share a nozzle row for coloring, for example, as a part of nozzle rows for forming a modeling layer and a supporting layer. Meanwhile, in this case, the nozzle row for coloring is originally a nozzle row required for forming a colored three-dimensional object. Therefore, according to this configuration; for example, the nozzle row provided to the three-dimensional object forming device can be used more efficiently. Moreover, accordingly a modeling layer and a supporting layer can appropriately be formed by using a plurality of nozzle rows, for example, while enlargement of the device and increase in cost being controlled more properly.

Incidentally, explained above is a configuration in which a plurality of nozzle rows are used for forming a modeling layer or a supporting layer. Nevertheless, in a modification on the configuration of the head unit 12; it is possible that, for example, a plurality of nozzle rows are used, as nozzle rows for discharging ink droplets of coloring ink of the same color.

FIG. 6B shows another example of a configuration in a modification of the head unit 12. In this configuration, the head unit 12 includes a plurality of inkjet heads with respect to each color of Y, M, C, and K. More concretely to describe; in this case, the head unit 12 includes: a plurality of coloring heads 202y, a plurality of coloring heads 202m, a plurality of coloring heads 202c, and a plurality of coloring heads 202k. Then accordingly, the head unit 12 has a plurality of nozzle rows for colored ink of each color to be used for coloring.

In this case, at a time of forming a color layer that is an ink layer formed of coloring ink, the head unit 12 forms one color layer with a plurality of nozzle rows, with respect to each color of Y, M, C, and K. Moreover, with respect to two color layers laminated successively, the color layers are formed in such a way that ink dots formed by the same nozzle are not stacked at the same position.

If a configuration is made in this way, an effect of variation in a discharging performance of nozzles can appropriately be controlled, for example, with respect to the coloring ink. Moreover accordingly, for example, in the case of forming a colored three-dimensional object, it is possible to appropriately prevent a streak, unevenness, and the like from appearing in an image drawn by way of coloring. Furthermore, in this case, a plurality of inkjet heads are used for each color so that a color layer can be formed faster. Therefore, if a configuration is made in this way, for example, a colored three-dimensional object can appropriately be formed with a higher degree of accuracy.

Incidentally, explained above is a configuration in which the coloring head 202y through the coloring head 202k are additionally used besides the modeling material heads 204 and the supporting layer heads 210. Nevertheless, as a further modification on the configuration of the head unit 12, it is possible that, for example, the modeling material heads 204 are removed, and a modeling layer is formed only by the head 202y through the coloring head 202k. For example, if a color of a modeling layer does not matter, it is possible to use the coloring head 202y for Yellow, the coloring head 202m for Magenta, the coloring head 202c for Cyan, and the like, in stead of the first through third modeling material heads 204 shown in FIG. 2A.

Moreover, in this case, it is also possible to use an inkjet head selected in accordance with a color setup for a three-dimensional object to be formed, as an inkjet head substituting for the plurality of modeling material heads 204. For example, it is possible to use an inkjet head for white ink, and the like, as an inkjet head substituting for the first modeling material head 204. According to this configuration, for example, a three-dimensional object white-colored can appropriately be shaped. Moreover, with respect to an inkjet head to be used instead of the plurality of modeling material heads 204, by means of a selection among various ink including clear ink and black ink, a three-dimensional object can also be formed in various colors.

While the present disclosure being explained above with reference to the embodiment, a technical scope of the present disclosure is not limited to a scope of the embodiment described above. To the person with an ordinary skill in the art, it is well known that various changes and improvements can be added to the embodiment described above. According to the descriptions on the scope of claims for patent, it is clear that an embodiment comprising such a change or an improvement can also be included in the technical scope of the present disclosure.

INDUSTRIAL APPLICABILITY

The present disclosure can appropriately be used, for example, for a three-dimensional object forming device.

What is claimed is:

1. A three-dimensional object forming device for forming a three-dimensional object by an additive manufacturing method, the three-dimensional object forming device comprising:
    a head unit having at least one inkjet head provided with at least one nozzle row in which at least one nozzle is placed in a predetermined nozzle row direction; and
    a main scanning drive unit for having the head unit carry out a main scanning operation to discharge ink droplets from the nozzle while moving in a main scanning direction that intersects with the nozzle row direction;
    wherein, the head unit includes a plurality of the inkjet heads placed side by side in the main scanning direction, and the head unit has at least a plurality of rows of the nozzle rows in total, and a plurality of ink droplets for multiple uses are ejected by the plurality of inkjet heads, and a plurality of areas are formed for each of multiple uses in one ink layer by the nozzle rows of the plurality of rows, and a plurality of the ink layers are formed by laminating successively on the areas; and
    in an operation of forming at least any two ink layers laminated successively, among the plurality of ink layers formed on one area, ink droplets are discharged in such a way that ink dots formed by the same nozzle in each of the area are not stacked at the same position.

2. The three-dimensional object forming device according to claim 1, wherein
    the inkjet head discharges ink droplets of ultraviolet curable ink that is cured by irradiation of ultraviolet light.

3. The three-dimensional object forming device according to claim 1, wherein
    each of the nozzles in the plurality of nozzle rows discharges ink droplets in such a way that ink dots formed by the same nozzle are not stacked at the same position, in an operation of forming both two ink layers laminated successively, among the plurality of ink layers formed on the one area.

4. The three-dimensional object forming device according to claim 1, wherein
    the head unit forms a modeling layer that is an ink layer to constitute at least an internal section of the three-dimensional object, by using the plurality of nozzle rows.

5. The three-dimensional object forming device according to claim 1, wherein
    the head unit forms a supporting layer that is an ink layer to support a circumference of the three-dimensional object in a forming process, by using the plurality of nozzle rows.

6. The three-dimensional object forming device according to claim 1, wherein
    at least some nozzle rows among the plurality of nozzle rows discharge ink droplets of another kind of ink being different from the ink of the other nozzle rows.

7. The three-dimensional object forming device according to claim 1, wherein
    at least one nozzle row among the plurality of nozzle rows is a nozzle row for discharging ink droplets of coloring ink; and
    at least another nozzle row among the plurality of nozzle rows discharges ink droplets of ink as a material for, either a modeling layer that is an ink layer to constitute an internal section of the three-dimensional object, or a supporting layer that is an ink layer to support a circumference of the three-dimensional object in a forming process.

8. The three-dimensional object forming device according to claim 1, wherein
    the plurality of nozzle rows discharge ink droplets of the same ink.

9. The three-dimensional object forming device according to claim 1, wherein
    the plurality of nozzle rows discharge ink droplets of coloring ink of the same color.

10. The three-dimensional object forming device according to claim 1, wherein
    the head unit includes at least a plurality of the nozzle rows in one of the inkjet heads,
    the nozzle row is a row of a plurality of the nozzles arranged at a constant nozzle pitch in a direction in which the nozzles are arranged,
    each of the nozzle in one of the nozzle rows and each of the nozzle in an adjacent other nozzle row are arranged at different positions where the positions in a sub scanning direction are displaced from each other,
    wherein the sub scanning direction is perpendicular to the main scanning direction.

11. The three-dimensional object forming device according to claim 1, wherein the inkjet head includes:
    a plurality of same-use inkjet heads for ejecting ink droplets of same use,
    in an operation of forming one of the ink layers, the plurality of same-use inkjet heads respectively eject ink droplets to different positions.

* * * * *